US012626203B2

(12) United States Patent
Yoo et al.

(10) Patent No.: US 12,626,203 B2
(45) Date of Patent: May 12, 2026

(54) METHOD FOR GENERATING PREDICTION MODEL FOR SUPPLY LEAD TIME OF PARTS

(71) Applicant: VMS Solutions Co. Ltd., Yongin-si (KR)

(72) Inventors: Seock Kyu Yoo, Yongin-si (KR); Cherl Hong Park, Seoul (KR); KyungSik Lee, Seongnam-si (KR); SungWon Hong, Seoul (KR); HoJin Jung, Seoul (KR)

(73) Assignee: VMS Solutions Co. Ltd., Yongin-si (KR)

( * ) Notice: Subject to any disclaimer, the term of this patent is extended or adjusted under 35 U.S.C. 154(b) by 0 days.

(21) Appl. No.: 18/934,759

(22) Filed: Nov. 1, 2024

(65) Prior Publication Data

US 2025/0148389 A1     May 8, 2025

(30) Foreign Application Priority Data

Nov. 8, 2023     (KR) ........................ 10-2023-0153761

(51) Int. Cl.
G06Q 10/0631 (2023.01)
G06Q 10/04 (2023.01)

(52) U.S. Cl.
CPC ....... G06Q 10/06314 (2013.01); G06Q 10/04 (2013.01)

(58) Field of Classification Search
None
See application file for complete search history.

(56) References Cited

U.S. PATENT DOCUMENTS

| | | | | |
|---|---|---|---|---|
| 5,963,919 A | * | 10/1999 | Brinkley | ............ G06Q 10/0875 705/28 |
| 2003/0229550 A1 | * | 12/2003 | DiPrima | .............. G06Q 10/087 705/28 |
| 2007/0156543 A1 | * | 7/2007 | Klim | .................... G06Q 10/087 700/106 |

(Continued)

OTHER PUBLICATIONS

Y. Liu, C. Yang, K. Huang, W. Gui and S. Hu, "A Systematic Procurement Supply Chain Optimization Technique Based on Industrial Internet of Things and Application," in IEEE Internet of Things Journal, vol. 10, No. 8, pp. 7272-7292, 15 Apr. 15, 2023 (Year: 2023).*

*Primary Examiner* — Stephanie Z Delich
(74) *Attorney, Agent, or Firm* — Dinsmore & Shohl LLP; Yongsok Choi, Esq.

(57) ABSTRACT

Provided is a method for generating a lead time prediction model including: receiving input data from a user; identifying a final part corresponding to the input data; identifying one or more components that constitute the final part; classifying the identified one or more components into in-house production parts, which are produced in-house, and ordered parts, which are procured from suppliers; determining a lead time for the in-house production parts; obtaining first data including at least price data and historical lead time data, for each of the ordered parts; generating a model for generating a predicted lead time for at least one of the final part and the ordered parts, based on the obtained first data; and optimizing the model based on at least one of fixed costs, inventory costs, ordering costs, backlog costs, and demand loss costs.

7 Claims, 16 Drawing Sheets

(56) References Cited

U.S. PATENT DOCUMENTS

| 2009/0164262 | A1* | 6/2009 | Ettl ....................... | G06Q 10/06 |
| | | | | 705/7.12 |
| 2017/0185933 | A1* | 6/2017 | Adulyasak ........... | G06Q 10/087 |
| 2024/0078508 | A1* | 3/2024 | Godfrey ............... | G06Q 10/087 |
| 2025/0086586 | A1* | 3/2025 | Al-Temyatt ........ | G06Q 10/0875 |

\* cited by examiner

| RAW MATERIALS | PERIOD | PRICE | PROBABILITY |
|---|---|---|---|
| COPPER | 2023-08-07 | 8,800 | 0.2 |
| COPPER | 2023-08-07 | 8,900 | 0.5 |
| COPPER | 2023-08-07 | 9,000 | 0.3 |
| COPPER | 2023-08-14 | 9,000 | 0.3 |
| COPPER | 2023-08-14 | 9,100 | 0.6 |
| COPPER | 2023-08-14 | 9,200 | 0.1 |
| COPPER | 2023-08-21 | 8,900 | 0.3 |
| COPPER | 2023-08-21 | 9,000 | 0.5 |
| COPPER | 2023-08-21 | 9,100 | 0.2 |

| PART | COMPANY | PERIOD | SUPPLY LEAD TIME | PROBABILITY |
|------|---------|--------|------------------|-------------|
| WIRE | SUPPLIER1 | 2023-08-07 | 2.4 | 0.2 |
| WIRE | SUPPLIER2 | 2023-08-07 | 2.6 | 0.5 |
| WIRE | SUPPLIER3 | 2023-08-07 | 2.8 | 0.3 |
| WIRE | SUPPLIER1 | 2023-08-14 | 2.8 | 0.3 |
| WIRE | SUPPLIER2 | 2023-08-14 | 3.0 | 0.6 |
| WIRE | SUPPLIER3 | 2023-08-14 | 3.2 | 0.1 |
| WIRE | SUPPLIER1 | 2023-08-21 | 2.6 | 0.3 |
| WIRE | SUPPLIER2 | 2023-08-21 | 2.8 | 0.5 |
| WIRE | SUPPLIER3 | 2023-08-21 | 3.0 | 0.2 |

FIG. 7

| COPPER PRICE | ALUMINUM PRICE | NICKEL PRICE | COBALT PRICE | NEODYMIUM PRICE | LEAD TIME |
|---|---|---|---|---|---|
| 8.058999 | 2.62661 | 68.00943 | 53.92136 | 139.4383 | 7 |
| 7.988451 | 2.733997 | 23.593 | 56.63131 | 129.5598 | 6 |
| 7.623586 | 2.512069 | 23.01809 | 56.5984 | 116.0928 | 7 |
| 7.975223 | 2.517569 | 25.5909 | 56.56658 | 114.7682 | 9 |

FIG. 8
| $f_2$ | $f_3$ | $-$ | $f_4$ | $f_1$ | $/$ | $\times$ |
|---|---|---|---|---|---|---|
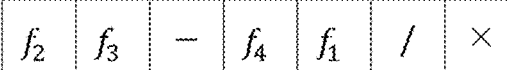
| $(f_2 - f_3)$ | $\dfrac{f_4}{f_1}$ | $\times$ |
|---|---|---|
$$(f_2 - f_3) \times \frac{f_4}{f_1}$$
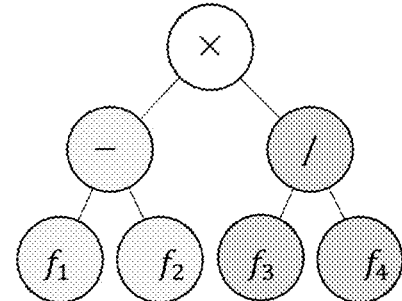
$f_1$ Aluminum Price
$f_2$ Copper Price
$f_3$ Cobalt Price
$f_4$ Nickel Price

FIG. 9

| COPPER PRICE | ALUMINUM PRICE | NICKEL PRICE | COBALT PRICE | NEODYMIUM PRICE | NEW FEATURE 1 | LEAD TIME |
|---|---|---|---|---|---|---|
| 8.058999 | 2.62661 | 68.00943 | 53.92136 | 139.4383 | -1187.49 | 7 |
| 7.988451 | 2.733997 | 23.593 | 56.63131 | 129.5598 | -419.763 | 6 |
| 7.623586 | 2.512069 | 23.01809 | 56.5984 | 116.0928 | -448.756 | 7 |
| 7.975223 | 2.517569 | 25.5909 | 56.56658 | 114.7682 | -493.927 | 9 |

FIG. 11

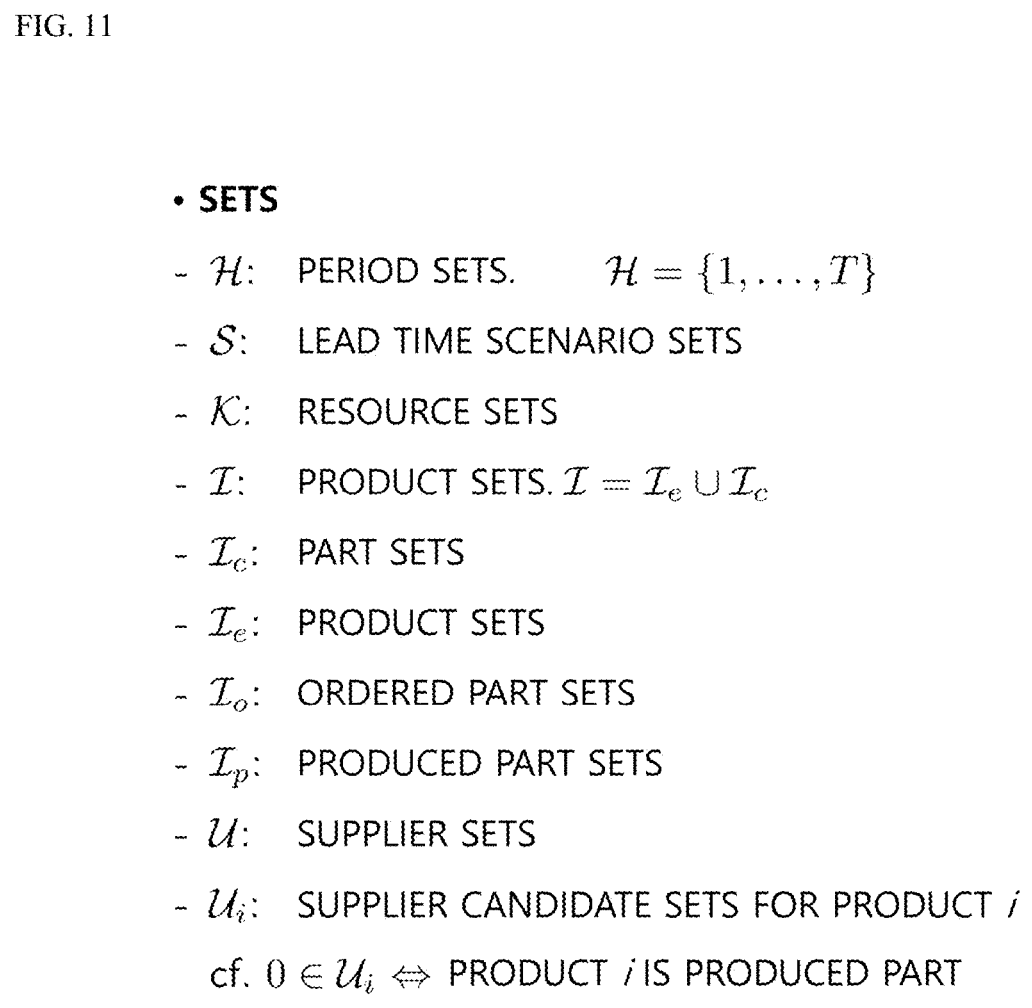

- SETS

- $\mathcal{H}$: PERIOD SETS. $\mathcal{H} = \{1, \ldots, T\}$

- $\mathcal{S}$: LEAD TIME SCENARIO SETS

- $\mathcal{K}$: RESOURCE SETS

- $\mathcal{I}$: PRODUCT SETS. $\mathcal{I} = \mathcal{I}_e \cup \mathcal{I}_c$

- $\mathcal{I}_c$: PART SETS

- $\mathcal{I}_e$: PRODUCT SETS

- $\mathcal{I}_o$: ORDERED PART SETS

- $\mathcal{I}_p$: PRODUCED PART SETS

- $\mathcal{U}$: SUPPLIER SETS

- $\mathcal{U}_i$: SUPPLIER CANDIDATE SETS FOR PRODUCT $i$ cf. $0 \in \mathcal{U}_i \Leftrightarrow$ PRODUCT $i$ IS PRODUCED PART

FIG. 12

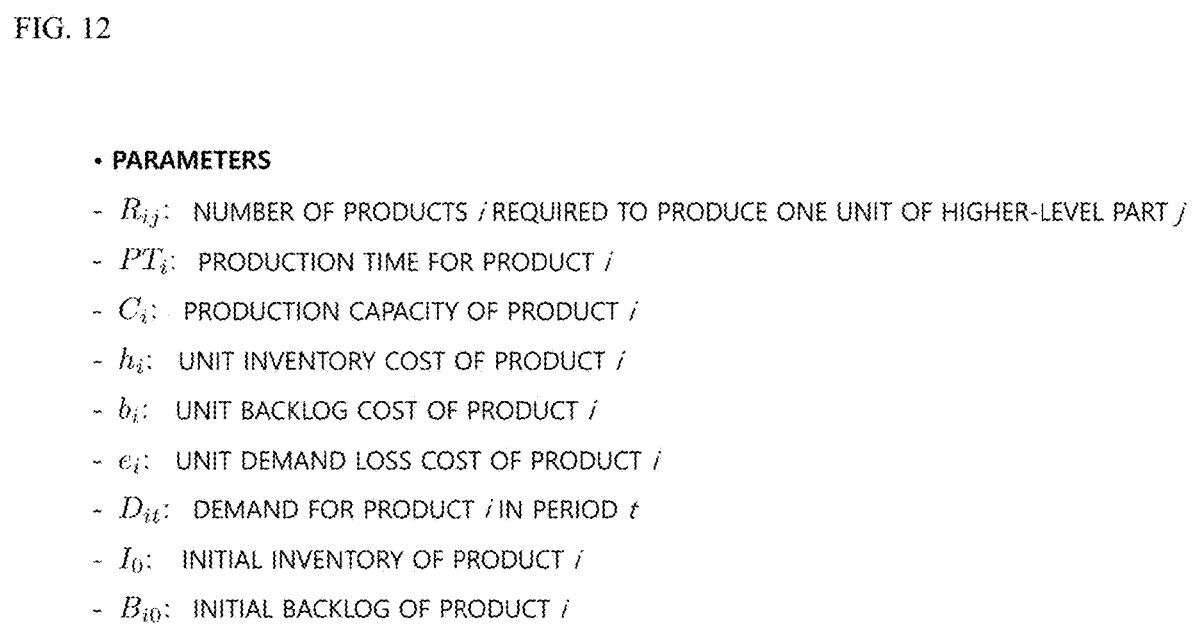

- PARAMETERS

- $R_{i,j}$:  NUMBER OF PRODUCTS $i$ REQUIRED TO PRODUCE ONE UNIT OF HIGHER-LEVEL PART $j$

- $PT_i$:  PRODUCTION TIME FOR PRODUCT $i$

- $C_i$:  PRODUCTION CAPACITY OF PRODUCT $i$

- $h_i$:  UNIT INVENTORY COST OF PRODUCT $i$

- $b_i$:  UNIT BACKLOG COST OF PRODUCT $i$

- $e_i$:  UNIT DEMAND LOSS COST OF PRODUCT $i$

- $D_{it}$:  DEMAND FOR PRODUCT $i$ IN PERIOD $t$

- $I_0$:  INITIAL INVENTORY OF PRODUCT $i$

- $B_{i0}$:  INITIAL BACKLOG OF PRODUCT $i$

FIG. 13

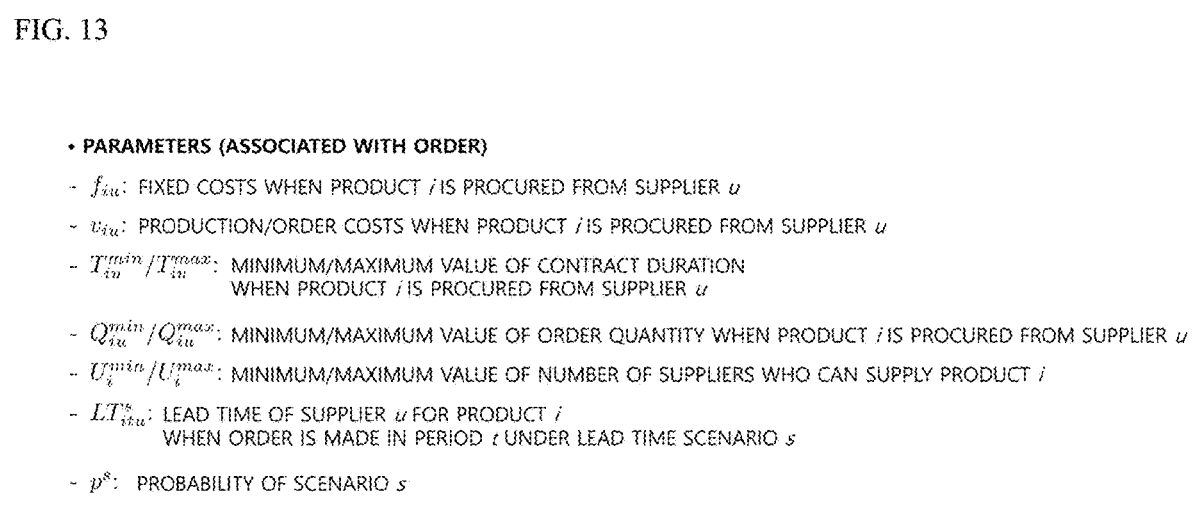

- PARAMETERS (ASSOCIATED WITH ORDER)

- $f_{iu}$: FIXED COSTS WHEN PRODUCT $i$ IS PROCURED FROM SUPPLIER $u$

- $v_{iu}$: PRODUCTION/ORDER COSTS WHEN PRODUCT $i$ IS PROCURED FROM SUPPLIER $u$

- $T_{iu}^{min}/T_{iu}^{max}$: MINIMUM/MAXIMUM VALUE OF CONTRACT DURATION
       WHEN PRODUCT $i$ IS PROCURED FROM SUPPLIER $u$

- $Q_{iu}^{min}/Q_{iu}^{max}$: MINIMUM/MAXIMUM VALUE OF ORDER QUANTITY WHEN PRODUCT $i$ IS PROCURED FROM SUPPLIER $u$

- $U_{i}^{min}/U_{i}^{max}$: MINIMUM/MAXIMUM VALUE OF NUMBER OF SUPPLIERS WHO CAN SUPPLY PRODUCT $i$

- $LT_{itu}^{s}$: LEAD TIME OF SUPPLIER $u$ FOR PRODUCT $i$
       WHEN ORDER IS MADE IN PERIOD $t$ UNDER LEAD TIME SCENARIO $s$

- $p^{s}$: PROBABILITY OF SCENARIO $s$

FIG. 14

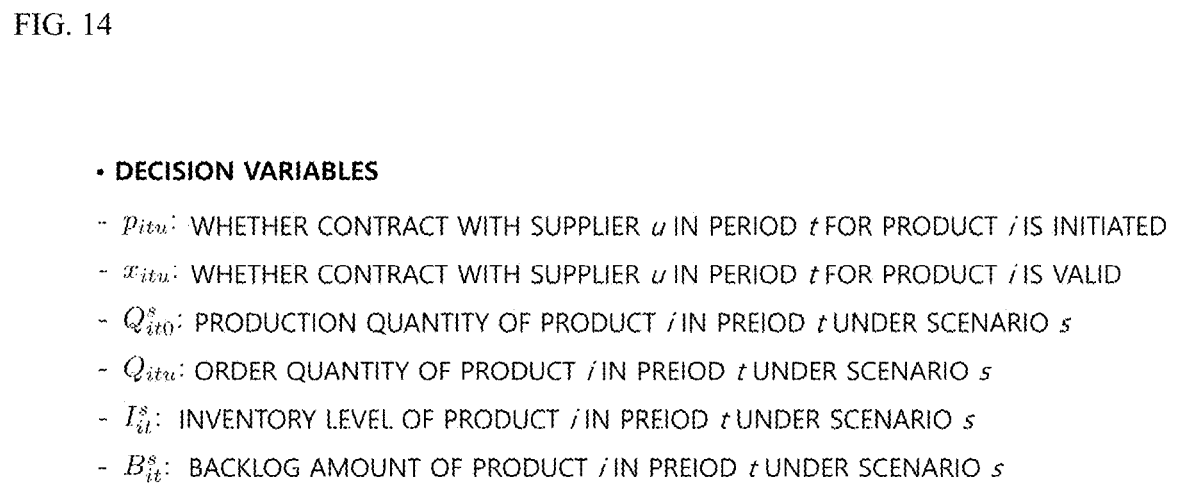

- DECISION VARIABLES

- $p_{itu}$: WHETHER CONTRACT WITH SUPPLIER $u$ IN PERIOD $t$ FOR PRODUCT $i$ IS INITIATED
    - $x_{itu}$: WHETHER CONTRACT WITH SUPPLIER $u$ IN PERIOD $t$ FOR PRODUCT $i$ IS VALID
    - $Q_{it0}^s$: PRODUCTION QUANTITY OF PRODUCT $i$ IN PREIOD $t$ UNDER SCENARIO $s$
    - $Q_{itu}$: ORDER QUANTITY OF PRODUCT $i$ IN PREIOD $t$ UNDER SCENARIO $s$
    - $I_{it}^s$: INVENTORY LEVEL OF PRODUCT $i$ IN PREIOD $t$ UNDER SCENARIO $s$
    - $B_{it}^s$: BACKLOG AMOUNT OF PRODUCT $i$ IN PREIOD $t$ UNDER SCENARIO $s$

METHOD FOR GENERATING PREDICTION MODEL FOR SUPPLY LEAD TIME OF PARTS

CROSS-REFERENCE TO RELATED APPLICATIONS

This application claims priority to and the benefit thereof under 35 U.S.C. § 119 to Korean Patent Application No. 10-2023-0153761 filed in the Korean Intellectual Property Office on Nov. 8, 2023, and Korean Patent Application, the entire contents of which are incorporated herein by reference.

BACKGROUND

(a) Field

The disclosure relates to a method for generating a supply lead time prediction model for parts, and more specifically, to a method for generating a supply lead time prediction model for a final part, considering factors such as price fluctuations of one or more component parts constituting the final part.

(b) Description of the Related Art

A value chain refers to the process in which value is added by combining resources such as raw materials, labor, and capital to produce goods or services. The global value chain is an extension of the traditional value chain with the concept of globalization, and in the modern society where globalization is rapidly progressing, companies are expanding their value chains globally to bypass trade barriers or reduce manufacturing costs, making it difficult for any company to independently produce goods and services.

In particular, most companies require multiple parts, such as raw materials or components, to manufacture a finished product (i.e., a final product manufactured by the company). Parts can be broadly classified into in-house produced parts, which are manufactured directly by the company, and ordered parts, which must be procured through purchasing or outsourcing from suppliers or subcontractors. While in-house produced parts have relatively fixed manufacturing times because the company manufactures them directly, the lead time (the time from ordering to production) required to supply ordered parts from suppliers or subcontractors is independent for each company.

This is because suppliers or subcontractors that manufacture and supply the same or similar parts may have different component ratios for the component parts such as raw materials or components constituting the final part, or there may be differences in the prices required to purchase or manufacture the component parts. These price fluctuations of the component parts may affect the supply lead time of the final part.

As a result, for companies that manufacture finished products, there is an increasing need for a method to predict the lead times of parts from each supplier or subcontractor and to derive an optimized production plan accordingly.

SUMMARY

Some embodiments may provide a method for generating a supply lead time prediction model for parts.

According to an aspect of an embodiment, a method for generating a lead time prediction model may include: receiving input data from a user; identifying a final part corresponding to the input data; identifying one or more components that constitute the final part; classifying the identified one or more components into in-house production parts, which are produced in-house, and ordered parts, which are procured from suppliers; determining a lead time for the in-house production parts; obtaining first data including at least price data and historical lead time data, for each of the ordered parts; generating a model for generating a predicted lead time for at least one of the final part and the ordered parts, based on the obtained first data; and optimizing the model based on at least one of fixed costs, inventory costs, ordering costs, backlog costs, and demand loss costs.

In some embodiments, the optimizing the model may include: optimizing the model by calculating a solution minimizing the following Equation:

$$\sum_{i\in I}\sum_{t\in\mathcal{H}}\sum_{u\in\mathcal{U}_i}f_{iu}p_{itu} +$$

$$\sum_{s\in S}p^s\left(\sum_{i\in I}\sum_{t\in\mathcal{H}}\left(h_i I_{it}^s + \sum_{u\in\mathcal{U}_i}v_{iu}Q_{itu}\right) + \left(\sum_{t=1}^{T-1}b_i\cdot B_t^s + e_i\cdot B_T^s\right)\right),$$

wherein the first term ($f_{iu}p_{itu}$) refers to the fixed cost component, and includes the fixed cost ($f_{iu}$) when product i is procured from supplier u, and the contract initiation status ($p_{itu}$) with supplier u in period t regarding product i, wherein the second term ($h_i I_{it}$) refers to the inventory cost component, and includes the unit inventory cost ($h_i$) for product i and the inventory level ($I_{it}$) of product i in period t under scenario s, wherein the third term ($v_{iu}Q_{itu}$) refers to the ordering cost component, and includes the unit production/order cost ($v_{iu}$) when product i is procured from supplier u, and the order quantity ($Q_{itu}$) of product i from supplier u in period t, wherein the fourth term·($b_i$·$B_t$) refers to the backlog cost component, and includes the unit backlog cost ($b_i$) for finished product i and the backlog amount ($B_t$) of finished product i in period t under scenario s, wherein the fifth term ($e_i$·$B_T$) refers to the demand loss cost component, and includes the unit demand loss cost ($e_i$) for finished product i and the backlog amount ($B_T$) of finished product i in period T under scenario s.

In some embodiments, the optimizing the model may include: minimizing the Equation considering at least one of the following constraints: number of suppliers, supply quantity, minimum contract duration, maximum contract duration, outsourced component inventory balance, produced component inventory balance, end-item inventory balance, production and ordering capacity, initial inventory, initial backlog, supplier selection, and non-negativity constraints.

In some embodiments, the method may further include: displaying the predicted lead time generated by the model on a user interface.

In some embodiments, the displaying the predicted lead time on the user interface may include: presenting the predicted lead time for the ordered parts over a predetermined period in the form of a graph; and in response to receiving a user selection of the predicted lead time displayed on the graph, displaying the probability of the predicted lead time as a pop-up in the form of a graph.

In some embodiments, the generating a model for generating a predicted lead time for at least one of the final part and the ordered parts, based on the obtained first data, may include: generating the model by using Sample Average Approximation (SAA) for the lead time scenario in the model, wherein the lead time scenario includes a vector representing lead time values for all suppliers of each ordered part.

According to an aspect of an embodiment, a computer-readable recording medium may include computer-executable instructions, wherein the instructions, when executed by a processor, perform operations including: receiving input data from a user; identifying a final part corresponding to the input data; identifying one or more components that constitute the final part; classifying the identified one or more components into in-house production parts, which are produced in-house, and ordered parts, which are procured from suppliers; determining a lead time for the in-house production parts; obtaining first data including at least price data and historical lead time data, for each of the ordered parts; generating a model for generating a predicted lead time for at least one of the final part and the ordered parts, based on the obtained first data; and optimizing the model based on at least one of fixed costs, inventory costs, ordering costs, backlog costs, and demand loss costs.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure will become apparent from the following description taken in conjunction with the accompanying drawings, in which:

FIGS. 7 to 9 are exemplary diagrams for explaining the operation of determining new features by a data analysis engine according to an embodiment.

FIGS. 11 to 14 show examples of factors that can be considered for the optimization model design of a data analysis engine according to an embodiment.

DETAILED DESCRIPTION OF THE INVENTION

Figure 1:
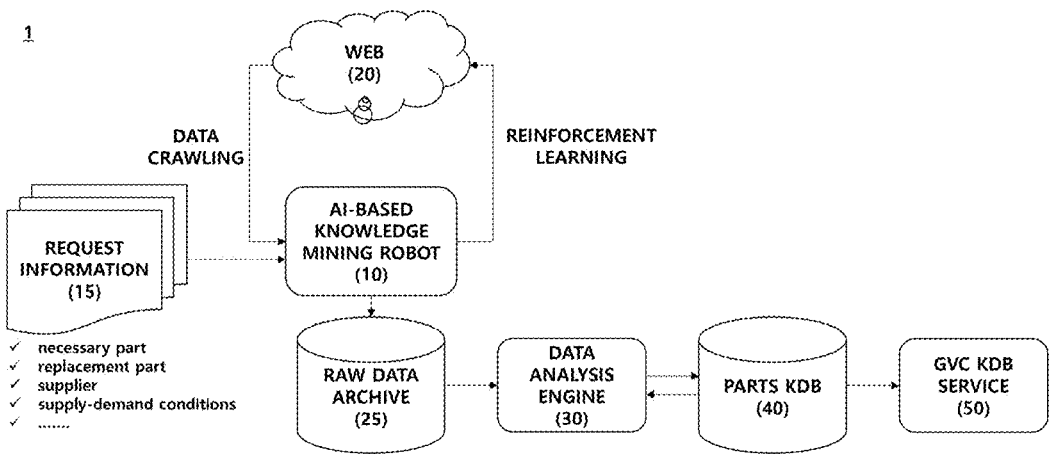
FIG. 1 is a schematic diagram illustrating a system for constructing a global value chain (GVC) database (DB) for parts procurement, including predicted lead time, according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

As used herein, each of such phrases as "A or B," "at least one of A and B," "at least one of A or B," "A, B, or C," "at least one of A, B, and C," and "at least one of A, B, or C," may include any possible combination of the items enumerated together in a corresponding one of the phrases.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

Hereinafter, various embodiments of the present disclosure are described with reference to the accompanying drawings.

Overview of the System for Constructing a Global Value Chain (GVC) Database (DB) for Parts Procurement Including Predicted Lead Time FIG. 1 is a schematic diagram illustrating a system for constructing a global value chain (GVC) database (DB) for parts procurement, including predicted lead time, according to an embodiment.

Referring to FIG. 1, a system 1 for constructing a GVC DB for parts procurement according to an embodiment includes an artificial intelligence (AI) based knowledge mining robot 10 configured to collect data from multiple resources on a web 20 based on request information 15 and store the collected data in a raw (unstructured) data archive 25. Further, the system includes a data analysis engine 30 configured to analyze raw data, classify the raw data into structured forms to generate parts-related data, and store the generated parts-related data in a parts knowledge database (KDB) 40. Based on the parts-related data stored in the parts KDB 40, the system may provide a GVC KDB service 50 to the user.

The AI-based knowledge mining robot 10 is a module that determines whether to perform data collection by classifying resources and collects data from resources on the web 20, such as websites, hyperlinks, or other data, utilizing data crawling technology. The AI-based knowledge mining robot 10 may be a software module implemented by a processor of a computing device or a server executing computer-executable instructions, a separate hardware module, or a combination of both. Since there is a vast amount of information on the web 20, it is necessary to perform data crawling quickly and effectively. In some embodiments, the AI-based knowledge mining robot 10 may be trained using supervised learning based on artificial intelligence.

Additionally, to clearly define the direction of data crawling performed by the AI-based knowledge mining robot 10, request information 15, which specifies the data to be acquired through data crawling, may be provided as an input to the AI-based knowledge mining robot 10. The request information 15 may be pre-set by an administrator and/or user, or it may be requested in real-time by the user. The request information 15 may include predicted lead time data for specific parts (or a list of parts) and price data for the specific parts.

The raw data archive 25 may store the data collected by the AI-based knowledge mining robot 10. For example, the data stored in the raw data archive 25 may be data collected from websites through a data crawler, indexed, and then stored.

In some embodiments, the data analysis engine 30 may obtain a first data, including at least price data and historical lead time data for each component part, based on structured data and/or raw data. Additionally, the data analysis engine 30 may perform preprocessing on the first data to generate second data, which is a new feature. The data analysis engine 30 may use the second data as a training dataset to perform learning, thereby generating a model for generating predicted lead time for at least one of a final part and one or more component parts. Here, the final part may be composed of the one or more component parts.

According to an embodiment, the model generated by the data analysis engine 30 for generating the predicted lead time may output the predicted lead time for at least one of the final part and one or more component parts. The predicted lead time, like other parts-related data, may also be stored in the parts KDB 40. Through a user interface (UI) provided by the GVC KDB service 50, users may search for parts and/or related resources (websites) and be provided with search results that include various data, such as the predicted lead time for parts.

According to an embodiment, through the UI of the GVC KDB service 50, a user such as a purchasing manager of an automobile manufacturer may input core keywords, such as the name, image, or use of the necessary part they wish to search for, as input information. The GVC KDB service 50 may search for corresponding data in the parts KDB 40 based on the input information. Alternatively, the GVC KDB service 50 may send a request (or command) to the data analysis engine 30 based on the input information. The data analysis engine 30 may provide the user with at least one of the following: price prediction data, supply/demand prediction data, predicted lead time data for the part, or other parts data stored in the parts KDB 40, in response to the request from the GVC KDB service 50. The data search process may be more effectively performed by applying artificial neural networks related to image processing or keyword searching. As a result, even if the user does not know the exact part name, they can still search for the necessary part. The UI of the GVC KDB service 50 will be described in detail later. Through the GVC KDB service 50, constructed as described above, the user such as the purchasing manager of the automobile manufacturer can easily and quickly search for the necessary part, a replacement part, or a similar part. In addition to reducing the user's search burden, it ultimately reduces the monetary and time costs that arise due to parts supply issues for manufacturers by providing predictive information on supply and demand situations, including price prediction data and predicted lead time for such parts.

AI-Based Knowledge Mining Robot

Figure 2:
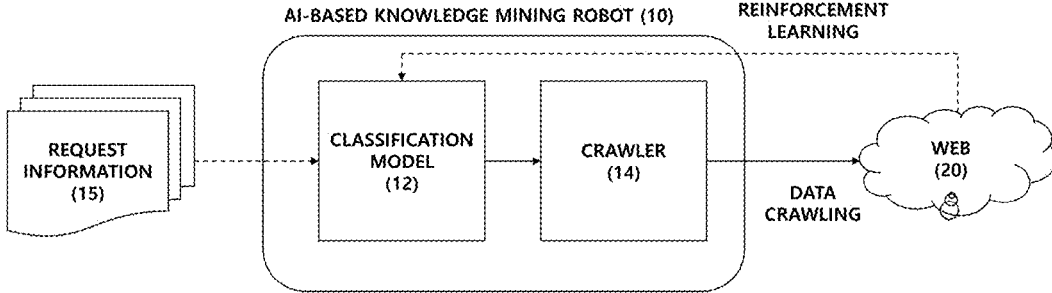
FIG. 2 is a schematic diagram illustrating an AI-based knowledge mining robot according to an embodiment.

FIG. 2 is a schematic diagram illustrating the AI-based knowledge mining robot according to an embodiment.

Referring to FIG. 2, the AI-based knowledge mining robot 10 according to an embodiment may include a classification model 12 and a crawler 14.

The classification model 12 is a model for classifying numerous resources, such as websites, web pages, hyperlinks, and data resources on the web 20, based on request information 15. According to an embodiment, the classification model 12 may classify resources on the web 20 based on whether the specific resource is related to the part to be collected. The classification model 12 may undergo a supervised learning process based on the request information 15 and pre-trained sample web pages. The classification model 12 may allow the crawler 14 to either perform or not perform data collection based on the classification results. In other words, if a particular resource is classified (i.e., determined) as related to the user's requested part by the classification model 12, the crawler 14 may collect data from that resource. Conversely, if the resource is classified as unrelated, the crawler 14 may not collect data from that resource.

The crawler 14 is a software module for performing actual data crawling. In an example, if a specific resource is classified as related to the necessary part by the classification model 12, the crawler 14 may access that resource, collect data, and perform indexing on the collected data. Then the crawler may explore other resources related to the current resource (e.g., related URLs, hyperlinks, etc.). If the newly discovered resources are classified as related to the necessary part by the classification model, the crawler 14 may repeat the process of collecting and indexing data from those resources. In other words, the crawler 14 may move around (crawl) various resources, collect data, and generate an index, which indicates where the data is located, to store in the raw data archive 25.

In some embodiments, the crawler 14 may store at least one of the following in the raw data archive 25: the original text of the page, a set of words, a part image, or classification accuracy of a specific resource. The crawler 14 may generate an index based on the stored data, and repeat the process across various resources. Classification accuracy may refer to the numerical assessment of whether a specific resource is related to the necessary part as determined by the classification model. If the classification accuracy is higher than a threshold, the specific resource is classified as related to the necessary part; and if the classification accuracy is below the threshold, it is classified as unrelated.

According to an embodiment, if request information 15 is pre-set to construct a database, a parts list may be included in the request information and provided to the AI-based knowledge mining robot 10. For example, if the parts list of an automobile is included in the request information, data crawling on the parts list of the automobile may be continuously performed, ensuring that the latest data is maintained in the parts KDB 40. If additional parts are needed, the parts list included in the request information may be updated, allowing the parts KDB 40 to be updated accordingly.

In some cases, the user may generate request information in real-time for a part that was not initially included in the request information. In this case, the AI-based knowledge mining robot 10 may be configured to perform data crawling in real time.

After the data is collected and indexed by the crawler 14 from resources on the web 20, the classification model 12 of the AI-based knowledge mining robot 10 may evaluate the collected data and enhance the effectiveness of the data collection process through reinforcement learning that rewards this evaluation.

Data Analysis Engine

Figure 3:
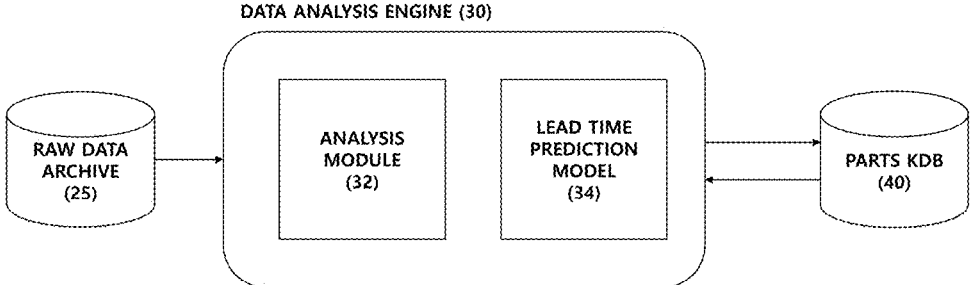
FIG. 3 is a schematic diagram illustrating a data analysis engine 30 according to an embodiment.

FIG. 3 is a schematic diagram illustrating the data analysis engine 30 according to an embodiment.

Referring to FIG. 3, the data analysis engine 30 includes an analysis module 32 for analyzing and structuring the raw (unstructured) data stored in the raw data archive 25, and a lead time prediction model 34 for generating the predicted lead time for each part based on the data stored in the raw data archive 25 and/or the parts KDB 40.

The analysis module 32 may analyze the raw (unstructured) data stored in the raw data archive 25 and classify it into structured forms of information for each part. According to an embodiment, the analysis module 32 may classify the information for each part into categories such as part name, part code, manufacturer, detailed specifications, and price by period (time-based pricing). In this case, multiple prices may exist for the same part at different times due to price fluctuations, and all of these prices may be classified in a structured format. However, the specific classification format of the information may vary.

According to an embodiment, the lead time prediction model 34 may learn by using a genetic programming-based decision tree algorithm based on first data, which includes at least historical (past) or current price data and lead time data for each part stored in the raw data archive 25 and/or the parts KDB 40, and generate predicted lead time data. The lead time prediction model 34 may use machine learning, reinforcement learning, or other learning methods, without being limited to any specific type.

More specifically, the lead time prediction model 34 may obtain the first data, which includes at least the price data and historical lead time data for each component part stored in the raw data archive 25 and/or the parts KDB 40, preprocess it to generate second data, and perform supervised learning based on the second data. The second data and/or the first data may constitute a supervised learning dataset. The lead time prediction model 34 may learn to output the predicted lead time based on the supervised learning dataset. Once the supervised learning is complete, the lead time prediction model 34 may generate (or pre-generate) and provide the predicted lead time for the user's requested parts. Here, the predicted lead time may refer to the time expected to be taken from ordering the user's requested parts from a supplier or subcontractor until the parts are produced (or delivered).

In some embodiments, the lead time prediction model 34 may learn by using a decision tree algorithm. To enhance the performance of the decision tree algorithm based on genetic programming, the lead time prediction model 34 may perform preprocessing on the first data, which is a training dataset. For example, the lead time prediction model 34 may determine second data, which is a new feature, from the training dataset. The lead time prediction model 34 may then perform learning based on the second data and/or first data. In some embodiments, the lead time prediction model 34 may generate a plurality of new features (second data).

The lead time prediction model 34 may determine a mean square error (MSE) improvement of the model using the second data and/or first data. If the MSE improvement exceeds a reference value, the lead time prediction model 34 may retain the new feature (second data). If the MSE improvement does not exceed the reference value, the lead time prediction model 34 may modify (or remove) the second data. For example, the lead time prediction model 34 may remove at least one of the plurality of second data and generate new features (third data). The lead time prediction model 34 may determine which features survive among the plurality of new features through a tournament. The lead time prediction model 34 may generate new features (i.e., second data and/or third data) using mutation and crossover operations. The lead time prediction model 34 may continue modifying the new features until the MSE improvement exceeds the reference value.

According to an embodiment, the lead time prediction model 34 may generate new features (second data) by considering certain conditions. In some embodiments, the lead time prediction model 34 may consider a first condition that involves matching the units of the data in the training dataset. In this case, the lead time prediction model 34 may exclude new features where the units do not match. For example, the lead time prediction model 34 may exclude combinations of features with mismatched units, such as 'height' and 'time'. Additionally, the lead time prediction model 34 may consider a second condition, which involves using arithmetic operators such as addition ('+'), subtraction ('−'), multiplication ('*'), and division ('/') on the data in the first data. In some embodiments, the lead time prediction model 34 may consider both the first and second conditions together.

In conventional genetic programming, various operations are applied without considering units, which leads to a lack of interpretability in the extracted features. However, the data analysis engine 30 according to an embodiment improves both the performance and interpretability of the genetic programming-based decision tree algorithm by using arithmetic operators to match the units of the new features (i.e., second data) generated during preprocessing.

For specific examples of how the lead time prediction model 34 generates and removes new features, refer to FIGS. 7 to 10, which will be described in more detail later.

The data generated by the data analysis engine 30, including predicted lead time data and other parts-related data, may be stored in the parts KDB 40.

GVC KDB Service

Figure 4:
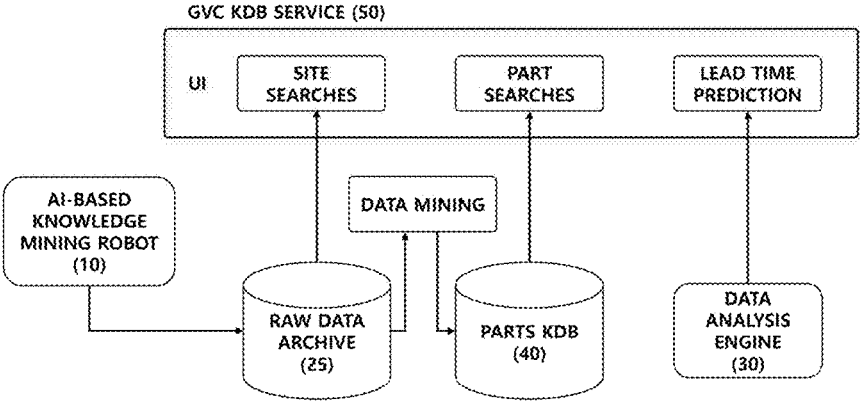
FIG. 4 is a schematic diagram illustrating a method for providing the results of an AI-based knowledge mining robot and a data analysis engine to the GVC KDB service according to an embodiment.

FIG. 4 is a schematic diagram illustrating a method for providing the results of the AI-based knowledge mining robot and the data analysis engine to the GVC KDB service according to an embodiment.

Referring to FIG. 4, the GVC KDB service 50 may provide a UI that allows users to perform site searches and part searches. The GVC KDB service 50 may be provided via a dedicated server or in the form of a cloud service, without limitation.

According to an embodiment, the data collected through techniques such as data crawling by the AI-based knowledge mining robot 10 and stored in the raw data archive 25 includes index information related to the resources from which the data was collected (e.g., websites, hyperlinks, etc.). Therefore, when a user performs a "site search," the index information from the raw data archive 25 may be provided to the UI of the GVC KDB service 50.

Further, In some embodiments, the parts KDB 40 stores predicted lead time data, price prediction data, and other data related to each part, obtained through data mining, scraping, learning, and analysis and prediction by the data analysis engine 30. When a user performs a "part search," the data from the parts KDB 40 may be provided to the UI of the GVC KDB service 50.

For example, during part searches, a user such as a purchasing manager of an automobile manufacturer may input, through the UI of the GVC KDB service 50, at least one of the following as input information: the name, image, specifications, price data at a specific time point, supply lead time history, or usage (e.g., the name of the finished product, such as copper for an automobile) of the user's requested part. The GVC KDB service 50 may search the parts KDB 40 based on the input information and present the corresponding results in the UI. When the user inputs an image as the input information, the process may involve AI-based image processing technology to find the same or similar image from the parts KDB 40.

According to an embodiment, the UI of the GVC KDB service 50 may provide the predicted lead time generated by the data analysis engine 30 (lead time prediction model 34). For example, the user may input one or more part names as input data through the UI. In some cases, the user may also input data such as price data in addition to the part name, and this is not limited thereto.

According to an embodiment, the data analysis engine 30 may obtain the first data from the raw data archive 25 and/or parts KDB 40 based on the input data. The first data may include at least price data and historical lead time data for each of the one or more component parts. Then, the data analysis engine 30 may perform preprocessing on the first data to generate at least one new feature, referred to as the second data. However, in other cases, components other than the data analysis engine 30 (e.g., GVC KDB service 50, etc.) may generate at least one second data, and this is not limited to the data analysis engine 30. The operation of generating at least one second data can be understood as a data preprocessing operation. The data analysis engine 30 may be trained to generate predicted lead time based on at least one second data and/or the first data. The predicted lead time generated by the data analysis engine 30 may be provided to the UI.

Figure 5:
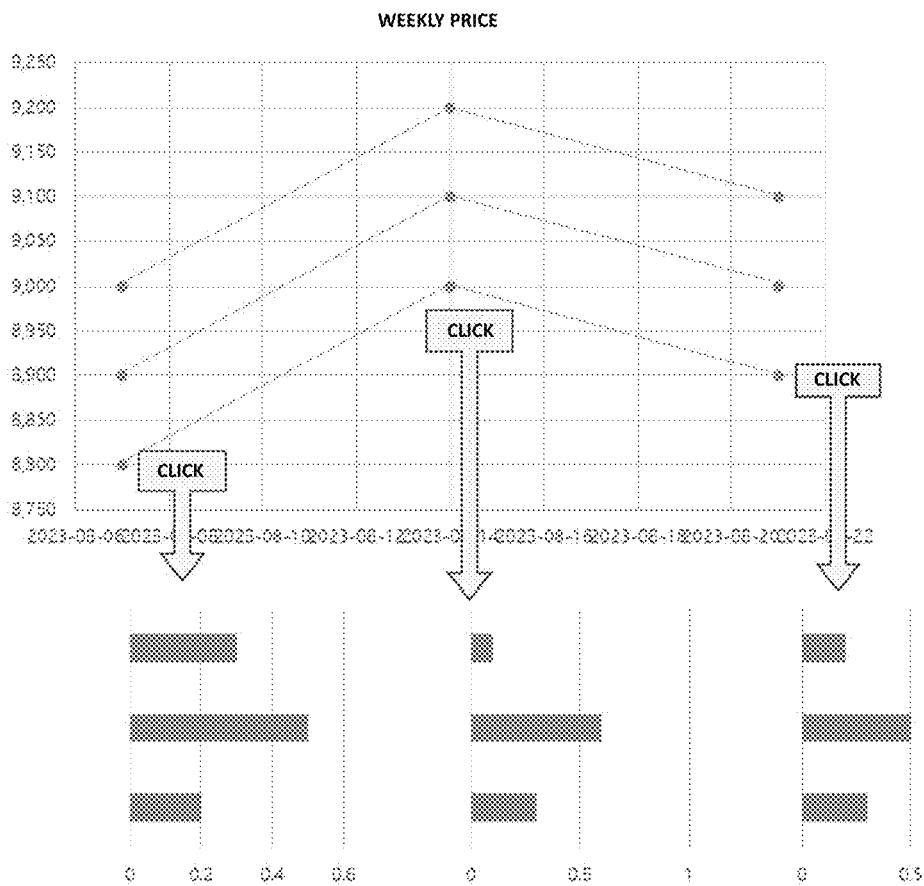
FIG. 5 is an example screen displaying data of part price prediction on a user interface (UI) of the GVC KDB service according to an embodiment.

FIG. 5 is an example screen displaying data of part price prediction on a user interface (UI) of the GVC KDB service according to an embodiment.

Referring to FIG. 5, the UI of the GVC KDB service may present price prediction data for parts over a specified period in the form of a graph. In an example of FIG. 5, the price prediction data for copper (component part), the raw material of a wire (final part), is displayed weekly in a graph. When the user clicks on the price prediction data displayed on the graph, the probability of each predicted price may pop up in the form of a bar graph. For example, for the week corresponding to Aug. 7, 2023, the probability that the price of copper will be 8800 won may be 0.2, the probability that it will be 8900 won may be 0.5, and the probability that it will be 9000 won may be 0.3. This allows the user to simultaneously check the price prediction data and its probability.

The price prediction data may be generated by the data analysis engine 30 based on the part's price data, i.e., the part's current price and historical prices, and a separate module may be configured within the data analysis engine 30 to generate the price prediction data.

Figure 6:
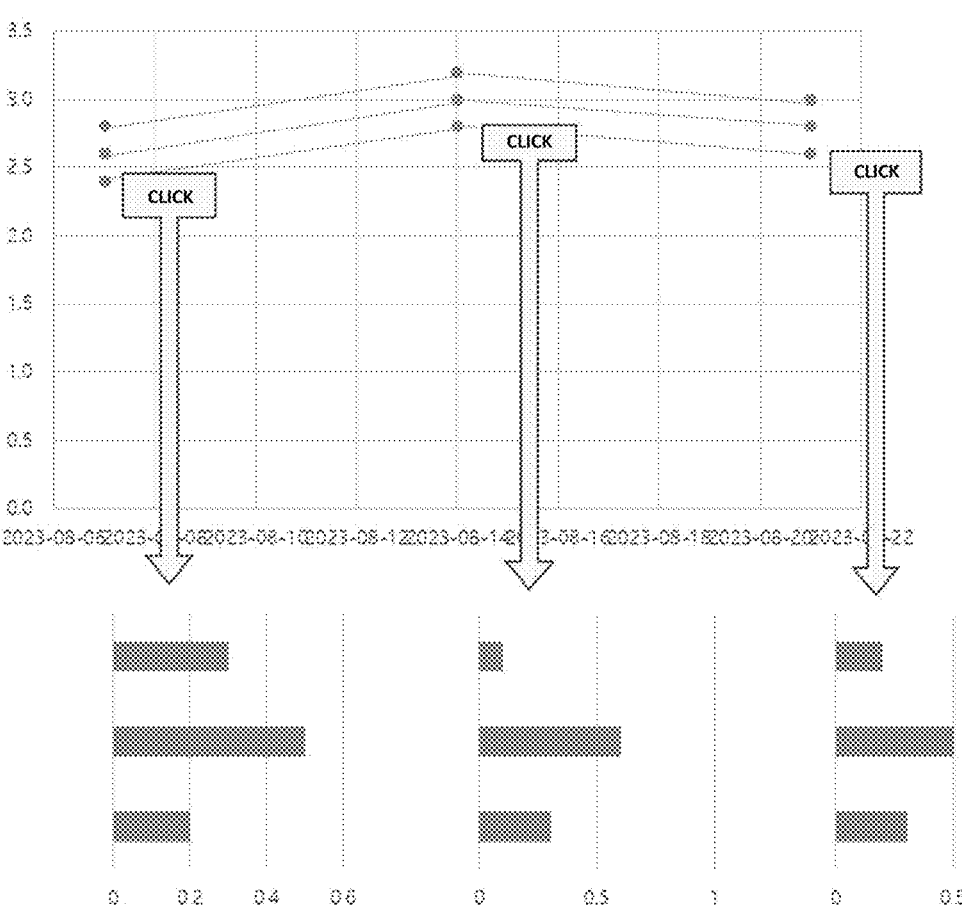
FIG. 6 is an example screen displaying the predicted lead time of parts on a user interface (UI) of the GVC KDB service according to an embodiment.

FIG. 6 is an example screen displaying the predicted lead time of parts on a user interface (UI) of the GVC KDB service according to an embodiment.

Referring to FIG. 6, the UI of the GVC KDB service may present predicted lead time data for parts over a specified period in the form of a graph. In an example of FIG. 6, the predicted lead time for each supplier or subcontractor for the wire (final part) is displayed on a weekly graph. When the user clicks on the predicted lead time displayed on the graph, the probability of each predicted lead time may pop up in the form of a bar graph. For example, for the week corresponding to Aug. 7, 2023, the probability that the predicted lead time for the wire will be 2.4 weeks may be 0.2, the probability that it will be 2.6 weeks may be 0.5, and the probability that it will be 2.8 weeks may be 0.3. This allows the user to simultaneously check the predicted lead time and its probability. As mentioned above, the predicted lead time may be generated by the data analysis engine 30 based on data from the parts KDB 40 and/or the raw data archive 25.
Genetic Programming-Based Feature Extraction FIGS. 7 to 9 are example diagrams explaining the operation of determining new features by the data analysis engine according to an embodiment.

Referring to FIG. 7, the data analysis engine (e.g., element 30 in FIG. 1) may obtain input data. The input data may be entered by the user through a part search via the GVC KDB service (e.g., element 50 in FIG. 1). In an example of FIG. 7, the input data may be the name of the final part, for example, wire. Based on the input data, the data analysis engine may obtain a first data, which includes at least the price data and historical lead time data for each of the component parts (materials) used to manufacture the wire (final part), such as copper, aluminum, nickel, cobalt, and neodymium. In other words, as shown in FIG. 7, the first data may include the prices of copper, aluminum, nickel, cobalt, and neodymium, and lead time. The unit for raw material prices may be USD/kg, and the unit for lead time may be weeks. The price data may represent the specific time-based price for each part, i.e., copper, nickel, cobalt, and neodymium. In other examples, the price data may include both the current price and historical prices for each part. The part names, price data, and historical lead time data for each part may either be entered by the user or obtained from the parts KDB 40 or the raw data archive 25.

The data analysis engine may perform preprocessing on the first data to generate a new feature by combining existing features such as the prices of nickel and cobalt. As explained in detail below, according to the embodiments of the present disclosure, the performance of a decision tree with limited height (depth) may be improved by generating a decision tree based on the new feature.

Referring to FIG. 8, the data analysis engine according to an embodiment may generate a new feature, referred to as second data, using the first data and arithmetic operators. Specifically, the data analysis engine may combine the first data, such as the prices of aluminum (f1), copper (f2), cobalt (f3), and nickel (f4), with arithmetic operators to generate a new feature (second data). At this time, the data analysis engine may generate second data by using arithmetic operators and matching the units of the first data. For example, the data analysis engine may generate a new feature (i.e., second data) based on a difference between copper price (f2) and cobalt price (f3) and a ratio of aluminum price (f1) and nickel price (f4). The data analysis engine may generate second data as (copper price (f2)−cobalt price (f3))*(nickel price (f4)/aluminum price (f1)). The operation of initially generating a new feature (second data) by the data analysis engine may be performed by randomly combining the first data with arithmetic operators within a given length while matching the operational units.

According to an embodiment, during the process, the data analysis engine may exclude combinations where the operational units do not match among multiple combinations. For example, in combinations involving the arithmetic operators addition ('+') or subtraction ('−'), the data analysis engine may exclude combinations where the units of the data being added or subtracted do not match. That is, the data analysis engine may generate second data only for combinations where the units of the data being added or subtracted are consistent. However, the embodiment is not limited to this, and the data analysis engine may also exclude combinations involving multiplication ('*') and division ('/') where the operational units do not match.

Referring to FIG. 9, the data analysis engine may obtain second data as a new feature (New Feature 1). The data analysis engine may perform training to generate predicted lead time based on the second data (and/or the first data). Once training is completed, the data analysis engine may receive input data, preprocess it to generate second data, and then generate and output the predicted lead time based on the second data.

The data analysis engine may determine the MSE (Mean Square Error) improvement of predictions using the new feature (second data). If the MSE improvement is less than or equal to (or less than) a reference value, the data analysis engine may generate another new feature, referred to as third data. The data analysis engine may continue to generate a new feature by combining the first data and arithmetic operators until the MSE improvement exceeds (or is greater than or equal to) the reference value. Once the MSE improvement exceeds the reference value, the data analysis engine may retain the generated new feature.

Figure 10:
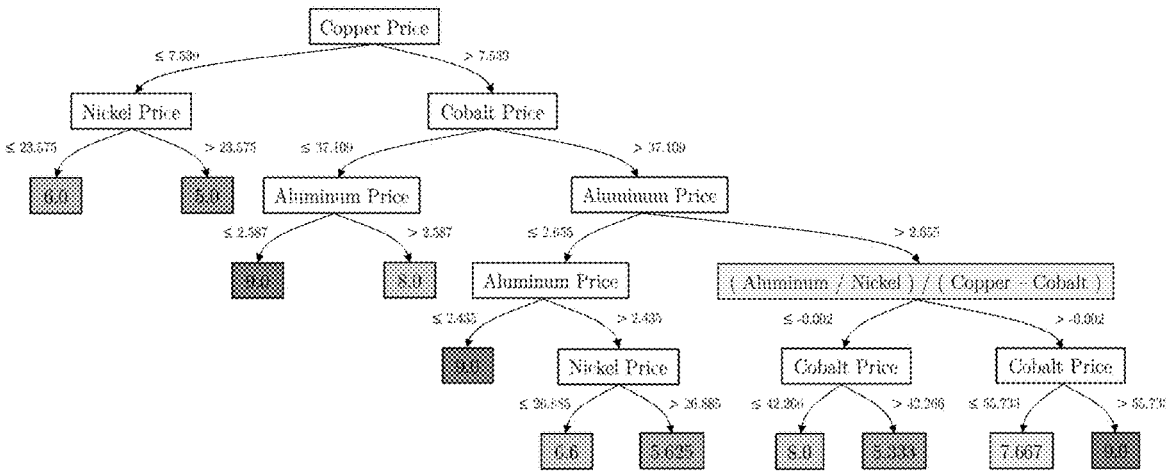
FIG. 10 is an exemplary diagram for explaining the operation of determining a new feature by a data analysis engine according to an embodiment.

FIG. 10 is an exemplary diagram explaining the operation of determining a new feature by the data analysis engine according to an embodiment.

Referring to FIG. 10, the data analysis engine (e.g., element 30 in FIG. 1) may receive input data, such as the name of the final part, and obtain the first data, which includes at least price data and historical lead time data for each of the one or more component parts constituting the final part, based on the input data. In an example of FIG. 10, the first data includes the prices of copper, aluminum, nickel, and cobalt, and these data may be input into the data analysis engine. As mentioned above, in the example, the price data for each part may include both the current price and historical prices, or at least one of these.

The data analysis engine may generate a new feature based on the first data. For example, the data analysis engine may generate a new feature based on the difference between the prices of copper and cobalt, and the price ratio between aluminum and nickel. Specifically, the data analysis engine may generate a new feature as '(a price ratio between aluminum and nickel)/(a difference between the prices of copper and cobalt)'. The data analysis engine may generate a decision tree that includes the new feature, as shown in FIG. 10. The numbers at the bottom of the decision tree, such as 6.0, 5.0, 9.0, 8.0, and 6.6, represent the results of regression.

In this way, the data analysis engine according to the embodiments of the present disclosure may improve the performance of the decision tree with limited height (depth) by performing preprocessing to generate a new feature and generating the decision tree based on the new feature.

Implementation of an Optimized Supplier-Specific Lead Time Prediction Regression Model FIGS. 11 to 14 show examples of factors that can be considered for the optimization model design of the data analysis engine according to an embodiment.

According to the embodiments of the present disclosure, the data analysis engine may optimize a trained model using a training dataset including new features, taking into account various constraints.

Specifically, the implementation method for the model for generating the predicted lead time may be performed by the data analysis engine. In this method, first, input data may be received from the user. For example, the input data may be the name of the final part. However, the input data may also include price data, pictures of the part, detailed specifications of the part, etc.

Next, the data analysis engine may identify the final part corresponding to the input data entered by the user and may identify one or more parts constituting the final part. For example, if the final part is identified as "wire," various raw materials that make up the wire, such as copper, aluminum, nickel, cobalt, and neodymium, may be identified as component parts.

Next, the identified parts may be classified into in-house produced parts, which can be produced by the company itself, and/or ordered parts, which must be procured from suppliers. As the in-house produced parts are directly procured by the company, lead time prediction may not be necessary. In contrast, for the ordered parts, the lead time may vary depending on the supplier or subcontractor, as the ratio of raw materials or components and the prices of materials or components may differ among suppliers.

Therefore, for the in-house produced parts, the lead time may be determined directly, while for each ordered part, the predicted lead time may need to be generated. To achieve this, the data analysis engine may obtain the first data, which includes at least price data and historical lead time data for each ordered part.

Then, the data analysis engine may generate a model for generating the predicted lead time for at least one of the final part and the ordered parts based on the obtained first data. For example, the predicted lead time for the ordered parts may be generated first, and this may then be used to generate the predicted lead time for the final part. To generate the model for generating the predicted lead time, supervised learning may be performed based on the first data. For example, a model may be generated by inputting the price data for each part included in the first data and generating the predicted lead time for each part as the output based on the input data. Then, the predicted lead time for each part may be compared with the historical lead time included in the first data, and training may be performed to reduce the error.

Next, optimization may be performed for the trained model based on at least one of fixed costs, inventory costs, ordering costs, backlog costs, and demand loss costs.

Subsequently, the predicted lead time generated by the optimized model may be stored in the parts KDB and displayed to the user through the user interface. At this time, a graph representing the predicted lead time over a predetermined period for at least one of the final part and one or more component parts may be presented. Additionally, in response to receiving a user selection (e.g., a mouse click) on the predicted lead time displayed in the graph, the probability of the predicted lead time may pop up and be displayed in the form of a graph (see FIG. 5 and FIG. 6).

Hereinafter, the implementation method of the model for generating the predicted lead time will be explained in more detail.

FIG. 11 illustrates sets of periods, lead time scenarios, resources, products, parts, finished products, ordered parts, produced parts, suppliers, and supplier candidates for products. For convenience, parts, finished products, and products will be collectively referred to as "product" hereinafter. A product may be a component part of another product or may be a finished product in itself.

FIG. 12 shows parameters such as the number of products required to produce one unit of a higher-level part, production time for the products, production capacity of the products, unit inventory cost of the products, unit backlog cost of the products, unit demand loss cost of the products, demand for the products in a specific period, initial inventory of the products, and initial backlog of the products.

FIG. 13 shows order-related parameters such as fixed costs when procuring a specific product from a specific supplier, unit costs when procuring a specific product from a specific supplier, contract duration when procuring a specific product from a specific supplier, order quantity when procuring a specific product from a specific supplier, the number of suppliers available for ordering a specific product, lead time of a specific supplier for a specific product in a specific lead time scenario in a specific period, and the probability of occurrence of a specific scenario.

FIG. 14 shows decision variables such as whether the contract is initiated, whether the contract is valid, product production quantity, order quantity, inventory level, and backlog amount. At this time, the sets and the parameters may be predetermined values, and the decision variables may be input by the user. The sets and the parameters may be stored as unstructured data, structured data, or historical data. According to an embodiment, the sets and the parameters described above may be stored in parts KDB 40. The decision variables may be input by the user through the user interface of the GVC service 50.

According to an embodiment, the data analysis engine (e.g., element 30 in FIG. 1) may design an optimization model for generating predicted lead time. The design of the optimization model focuses on minimizing the expected cost for all possible scenarios when predicting the lead time. However, the number of possible scenarios determined by the number of parts, the maximum number of suppliers providing the parts, and the maximum lead time is very large, making it difficult to consider all possible scenarios. For example, if there are three parts, a maximum of three suppliers for each part, and a maximum lead time of five, the number of possible scenarios is 5^(3*3), resulting in about 2 million possibilities. Accordingly, the data analysis engine may design the optimization model to consider a sufficiently large number of scenarios and derive values close to the original solution.

According to an embodiment, the data analysis engine may use Sample Average Approximation (SAA) for the lead time scenario in the optimization model for generating the predicted lead time. The lead time scenario may represent a vector including the lead time values for all parts (historical lead time data) from all suppliers. The data analysis engine may solve the problem by minimizing the average cost for all lead time scenarios. According to an embodiment, the data analysis engine may optimize the model for generating predicted lead time based on at least one of fixed costs, inventory costs, ordering costs, backlog costs, and demand loss costs.

To address the problem of establishing a procurement plan for each part needed by a manufacturer to produce a finished product, the data analysis engine may design an optimization model considering the elements of FIGS. 11 to

14. Parts may include both in-house produced parts, which can be produced by the company itself, and/or ordered parts, which must be procured from suppliers. In this case, the ordered parts are assumed to exist only at the final stage, and all (final) parts are assumed to be producible immediately once the component parts become available. It is also assumed that the suppliers or subcontractors have completed contracts in advance and must comply with the contract terms. As the in-house produced parts can be procured by the company itself, lead time prediction may not be necessary. In other words, while the production time for the in-house produced parts is fixed, the lead time for the ordered parts from the suppliers or subcontractors is uncertain due to the independent lead time distributions for each supplier. For example, for the same part, the order cost of supplier 1 may be 30 with an average lead time of 2 weeks, the order cost of supplier 2 may be 20 with an average lead time of 4 weeks, and the order cost of supplier 3 may be 10 with an average lead time of 6 weeks.

Thus, the data analysis engine may obtain a first data, which includes at least price data and historical lead time data for each ordered part, and generate a model for generating the predicted lead time for each ordered part based on the obtained first data. As described above, supervised learning may be performed based on the first data to generate the model. For example, a model may be generated by inputting the price data for each part included in the first data and generating the predicted lead time for each part as the output based on the input data. Then, the generated predicted lead time for each part may be compared with the historical lead time included in the first data, and the model may be trained to reduce the error. However, in addition to supervised learning, reinforcement learning may also be applied, and the training method is not limited to this.

Afterward, the data analysis engine may determine an objective function to minimize fixed costs, inventory costs, ordering costs, backlog costs, and demand loss costs. The data analysis engine may determine the objective function as shown in Equation 1.

$$\sum_{i \in I} \sum_{t \in \mathcal{H}} \sum_{u \in \mathcal{U}_i} f_{iu} p_{itu} + \qquad \text{[Equation 1]}$$

$$\sum_{s \in \mathcal{S}} p^s \left( \sum_{i \in I} \sum_{t \in \mathcal{H}} \left( h_i I_{it}^s + \sum_{u \in \mathcal{U}_i} v_{iu} Q_{itu} \right) + \left( \sum_{t=1}^{T-1} b_i \cdot B_t^s + e_i \cdot B_T^s \right) \right)$$

In Equation 1, the first term ($f_{iu}p_{itu}$) may refer to the fixed cost component. It includes the fixed cost ($f_{iu}$) when product i is procured from supplier u, and the contract initiation status ($p_{itu}$) with supplier u in period t regarding product i.

In Equation 1, the second term ($h_i I_{it}$) may refer to the inventory cost component. It includes the unit inventory cost ($h_i$) for product i and the inventory level ($I_{it}$) of product i in period t under scenario s.

In Equation 1, the third term ($v_{iu} Q_{itu}$) may refer to the ordering cost component. It includes the unit production/order cost ($v_{iu}$) when product i is procured from supplier u, and the order quantity ($Q_{itu}$) of product i from supplier u in period t.

In Equation 1, the fourth term·($b_i$·$B_t$) may refer to the backlog cost component. It includes the unit backlog cost ($b_i$) for finished product i and the backlog amount ($B_t$) of finished product i in period t under scenario s.

In Equation 1, the fifth term ($e_i$ $B_T$) may refer to the demand loss cost component. It includes the unit demand loss cost ($e_i$) for finished product i and the backlog amount ($B_T$) of finished product i in period T under scenario s.

The data analysis engine may find the solution that minimizes Equation 1.

The data analysis engine may design an optimization model that minimizes the objective function of Equation 1 while considering the constraints defined by Equations 2 to 15. Equation 2 is a constraint on the number of suppliers. Equation 3 is a constraint on supply quantity. Equation 4 is a constraint on the minimum contract duration. Equation 5 is a constraint on the maximum contract duration. Equation 6 is a constraint on the inventory balance for outsourced components. Equation 7 is a constraint on the inventory balance for produced components. Equation 8 is a constraint on the inventory balance for end-item components. Equation 9 is a constraint on production and ordering capacity. Equation 10 is a constraint on initial inventory. Equation 11 is a constraint on initial backlog. Equation 12 is a constraint on supplier selection. Equations 13 to 15 are non-negativity constraints.

Thus, the data analysis engine may optimize the model using the training dataset by minimizing Equation 1 while considering at least one of the following constraints: the number of suppliers, supply quantity, minimum contract duration, maximum contract duration, outsourced component inventory balance, produced component inventory balance, end-item inventory balance, production and ordering capacity, initial inventory, initial backlog, supplier selection, and non-negativity constraints. In other words, the data analysis engine may derive the solution to minimize fixed costs, inventory costs, ordering costs, backlog costs, and demand loss costs through the optimization model.

$$U_i^{min} \le \sum_{u \in \mathcal{U}_i} \sum_{t \in \mathcal{H}} p_{itu} \le U_i^{max}, \forall i \in \mathcal{I}_o \qquad \text{[Equation 2]}$$

$$Q_{iu}^{min} x_{itu} \le Q_{itu} \le Q_{iu}^{max} x_{itu}, \forall i \in \mathcal{I}_o, t \in \mathcal{H}, u \in \mathcal{U}_i \qquad \text{[Equation 3]}$$

$$x_{itu} \ge \sum_{\tau = t - T_{iu}^{min} + 1}^{t} p_{i\tau u}, \forall i \in \mathcal{I}_o, t \in \mathcal{H}, u \in \mathcal{U}_i \qquad \text{[Equation 4]}$$

$$\sum_{\tau = t - T_{iu}^{max} + 1}^{t} p_{i\tau u} \ge x_{itu}, \forall i \in \mathcal{I}_o, t \in \mathcal{H}, u \in \mathcal{U}_i \qquad \text{[Equation 5]}$$

$$I_{i(t-1)}^s + \sum_{u \in \mathcal{U}_i} \sum_{\tau : \tau + L_{i\tau u}^s = t} Q_{i\tau u} - \sum_{j \in I} R_{ij} Q_{jt0}^s = I_{it}^s, \qquad \text{[Equation 6]}$$
$$\forall i \in \mathcal{I}_o, t \in \mathcal{H}, s \in \mathcal{S}$$

$$I_{i(t-1)}^s + Q_{i(t-PT_i)0}^s - \sum_{j \in I} R_{ij} Q_{jt0}^s = I_{it}^s, \forall i \in \mathcal{I}_p, t \in \mathcal{H}, s \in \mathcal{S} \qquad \text{[Equation 7]}$$

$$I_{i(t-1)}^s - B_{i(t-1)}^s + \sum_{u \in \mathcal{U}_i} \sum_{\tau : \tau + L_{i\tau u}^s = t} Q_{i\tau u} - D_{it} = I_{it}^s - B_{it}^s, \qquad \text{[Equation 8]}$$
$$\forall i \in \mathcal{I}_e, t \in \mathcal{H}, s \in \mathcal{S}$$

$$Q_{it0}^s \le C_i, \forall i \in \mathcal{I}_p, t \in \mathcal{H}, s \in \mathcal{S} \qquad \text{[Equation 9]}$$

$$I_{i0}^s = I_{i0}, \forall i \in \mathcal{I}, s \in \mathcal{S} \qquad \text{[Equation 10]}$$

$$B_{i0}^s = B_{i0}, \forall i \in \mathcal{I}, s \in \mathcal{S} \qquad \text{[Equation 11]}$$

$$x_{itu}, p_{itu} \in \{0, 1\}, \forall i \in \mathcal{I}, t \in \mathcal{H}, u \in \mathcal{U}_i \qquad \text{[Equation 12]}$$

$$Q_{it0}^s \ge 0, \forall i \in \mathcal{I}_p, t \in \mathcal{H}, s \in \mathcal{S} \qquad \text{[Equation 13]}$$

-continued
$$Q_{itu} \ge 0, \forall i \in \mathcal{I}_o, t \in \mathcal{H}, s \in \mathcal{S} \qquad \text{[Equation 14]}$$

$$I_{it}^s, B_t^s \ge 0, \forall i \in \mathcal{I}, t \in \mathcal{H}, u \in \mathcal{U}_i, s \in \mathcal{S} \qquad \text{[Equation 15]}$$

Figure 15:
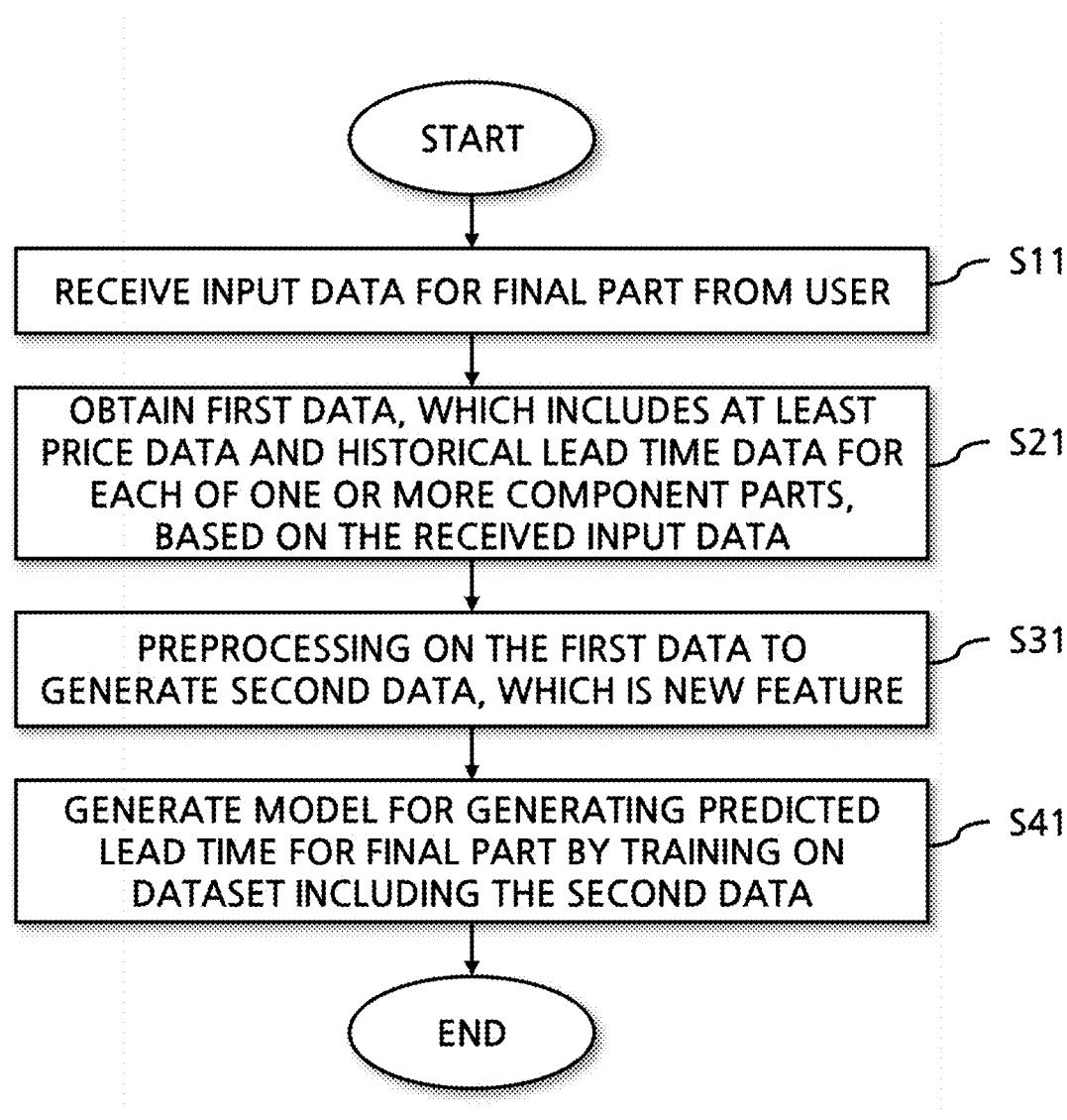
FIG. 15 is a flowchart illustrating a learning method for lead time prediction according to an embodiment.

Learning Method for Lead Time Prediction and Evaluation Method for Models Using New Features FIG. 15 is a flowchart illustrating a learning method for lead time prediction according to an embodiment.

Referring to FIG. 15, first, in step S11, input data for a final part may be received from the user. At this time, the final part may be composed of one or more component parts. The input data may be entered by the user through a part search using the GVC KDB service (e.g., element 50 in FIG. 1).

In step S21, a first data, which includes at least price data and historical lead time data for each of the one or more component parts, may be obtained based on the received input data. The first data may be obtained from data stored in the parts KDB 40 and/or the raw data archive 25. The first data may further include data related to the detailed specifications, sizes (dimensions), and supply-demand conditions of the parts.

In step S31, preprocessing may be performed on the first data to generate second data, which is a new feature. The preprocessing may involve combining the first data with arithmetic operators (addition, subtraction, multiplication, and division). At this time, combinations where the operational units do not match may be excluded from the multiple combinations generated by combining the first data and the arithmetic operators. For example, combinations involving addition or subtraction where the units of the data being added or subtracted do not match may be removed. However, the embodiment is not limited thereto.

In step S41, a model may be generated to generate the predicted lead time for at least one of the final part and the one or more component parts by training on a dataset including the second data. Additionally, the first data may also be part of the training dataset. For example, the model may be trained by using the second data as input and the predicted lead time included in the first data as output so that the predicted output lead time matches actual lead time, i.e., the historical lead time. Once the model is trained, it may generate a predicted lead time when a specific part is determined (i.e., when input data for the part is received from the user).

Figure 16:
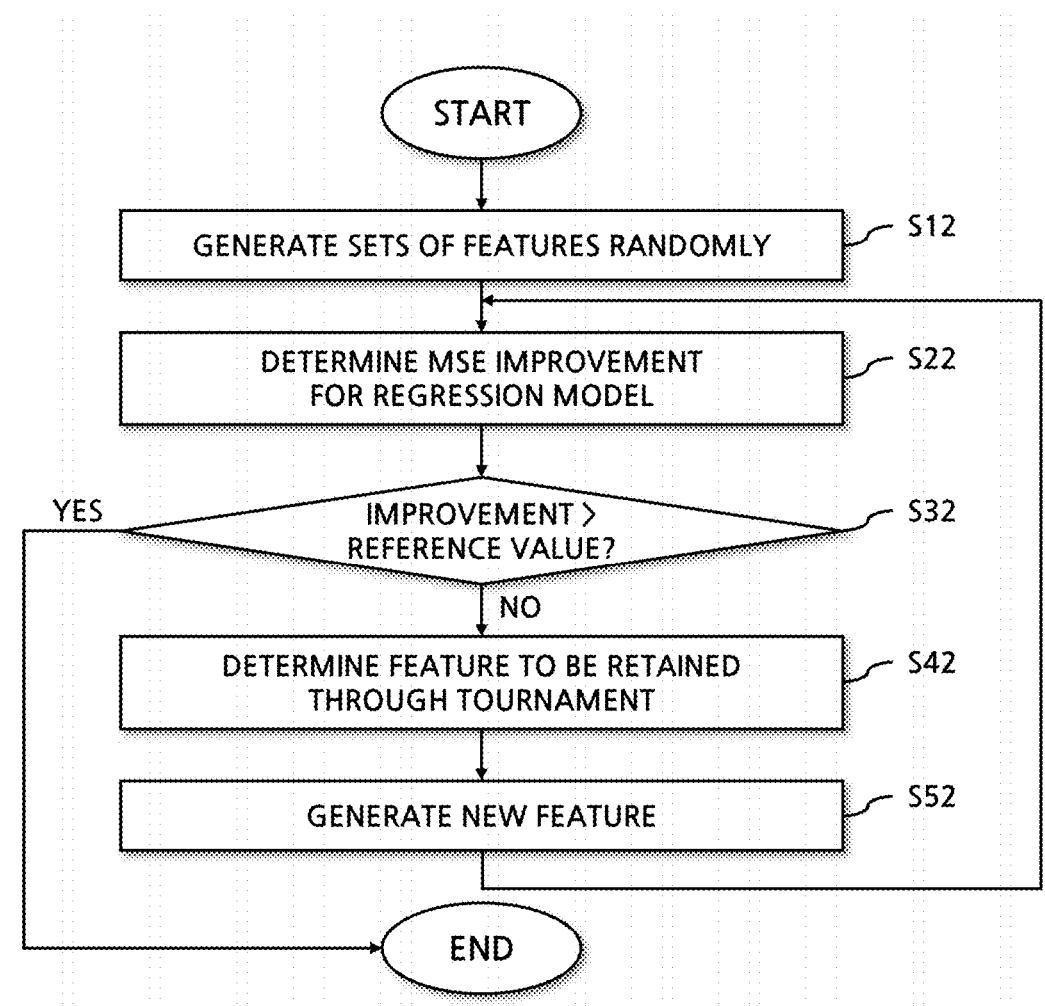
FIG. 16 is a flowchart illustrating an evaluation method for new features according to an embodiment.

FIG. 16 is a flowchart illustrating an evaluation method for new features according to an embodiment.

Referring to FIG. 16, in step S12, a plurality of new features, i.e., a plurality of second data, may be generated. When generating the plurality of second data, the operational units in the combinations using the first data and arithmetic operators may be matched.

In step S22, the MSE (Mean Square Error) improvement for the regression model using the plurality of second data may be determined.

In step S32, the retention of the second data may be determined based on the MSE improvement. For example, if the MSE improvement exceeds a reference value, the second data may be retained.

In step S42, if the MSE improvement is less than or equal to the reference value, the second data to be retained may be determined through a tournament. In other words, at least one second data may be eliminated from the plurality of second data. In some embodiments, all of the second data may be eliminated.

In step S52, a further new feature, i.e., third data, may be generated. For example, the third data may be generated using mutation and/or crossover operations. At this time, in step S41 of FIG. 15, the third data may be used as part of the training dataset for further learning.

Then, in step S22, the MSE improvement of the regression model using the third data may be determined. In step S32, if the MSE improvement exceeds the reference value, no further new feature is generated, and the evaluation process may end. If the MSE improvement is less than or equal to the reference value, the process may proceed to step S42.

Computer-Readable Recording Medium

It is evident that each step or operation of the method according to the embodiments of the present disclosure may be performed by a computer including one or more processors, based on the execution of a computer program stored on a computer-readable recording medium.

The computer-executable instructions stored on the aforementioned recording medium may be implemented through a computer program programmed to perform the corresponding steps, and the computer program may be stored on a computer-readable recording medium and executable by a processor. The computer-readable recording medium may be a non-transitory readable medium. In this case, a non-transitory readable medium refers to a medium that permanently stores data and is readable by a device, rather than a medium that stores data for only a brief moment, such as registers, caches, or memory. Specifically, programs for performing the various methods described above may be stored and provided on a non-transitory readable medium such as semiconductor memory devices like erasable programmable read-only memory (EPROM), electrically erasable programmable read-only memory (EEPROM), and flash memory devices, as well as non-volatile memory such as magnetic disks like internal hard disks and removable disks, magneto-optical disks, and CD-ROM and DVD-ROM disks.

The methods according to the various examples disclosed herein may be provided in the form of a computer program product. The computer program product may be distributed in the form of a machine-readable storage medium (e.g., compact disc read-only memory (CD-ROM)) or distributed online through an application store. In the case of online distribution, at least part of the computer program product may be temporarily stored or temporarily generated in the storage medium such as the memory of the manufacturer's server, the application store's server, or an intermediary server.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

In some embodiments, each component or a combination of two or more components described with reference to FIG. 1 to FIG. 16 may be implemented with digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, LED (light-emitting diode) monitor, OLED (organic LED) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

DESCRIPTION OF REFERENCE CHARACTERS

1: System for Building a Global Value Chain Database (DB) for Parts Procurement Including Predicted lead time
10: AI-Based Knowledge Mining Robot
15: Request Information
20: Web
25: Raw Data Archive
30: Data Analysis Engine
40: Parts Knowledge Database (KDB)
50: GVC KDB Service

What is claimed is:

1. A method for implementing a model for generating a predicted lead time, comprising:

receiving input data from a user;

identifying a final part corresponding to the input data;

identifying one or more components that constitute the final part;

classifying the identified one or more components into in-house production parts, which are produced in-house, and ordered parts, which are procured from suppliers;

determining a lead time for the in-house production parts;

obtaining, for each of the ordered parts, first data comprising at least price data and historical lead time data by: (i) operating an artificial intelligence (AI)-based knowledge mining robot including a trained classification model and a crawler to classify web resources as related or unrelated to the ordered part based on request information including at least a part identifier and data to be acquired, (ii) crawling and indexing data from the web resources classified as related and storing crawled unstructured data and index information in a raw data archive, and (iii) structuring, by a data analysis engine, the unstructured data into part-related fields including at least time-based price data and historical lead time data and storing the structured data in a parts knowledge database (KDB);

generating candidate feature expressions by combining the price data with arithmetic operators;

generating second data by removing an expression in which operational units do not match among the candidate feature expressions;

generating a model for generating the predicted lead time for at least one of the final part and the ordered parts by training, using a training dataset including the first data and the second data, a regression model comprising a genetic-programming-based decision tree, and iteratively updating the second data by: determining a mean square error (MSE) improvement attributable to each candidate feature expression, retaining a candidate feature expression when the MSE improvement exceeds a reference value, and otherwise generating third data using mutation and/or crossover operations and selecting surviving features through a tournament; and optimizing the model for generating the predicted lead time based on at least one of fixed costs, inventory costs, ordering costs, backlog costs, and demand loss costs.

2. The method of claim 1, wherein the optimizing the model comprises:

optimizing the model by calculating a solution minimizing the following Equation:

$$\sum_{i \in I} \sum_{t \in \mathcal{H}} \sum_{u \in \mathcal{U}_i} f_{iu} p_{itu} + \sum_{s \in S} p^s \left( \sum_{i \in I} \sum_{t \in \mathcal{H}} \left( h_i I_{it}^s \sum_{u \in \mathcal{U}_i} v_{iu} Q_{itu} \right) + \left( \sum_{t=1}^{T-1} b_i \cdot B_t^s + e_i \cdot B_T^s \right) \right)$$

wherein the first term ($f_{iu} p_{itu}$) refers to a fixed cost component, and comprises the fixed cost ($f_{iu}$) when product i is procured from supplier u, and the contract initiation status ($p_{itu}$) with supplier u in period t regarding product i, wherein the second term ($h_i I_{it}$) refers to an inventory cost component, and comprises the unit inventory cost ($h_i$) for product i and the inventory level ($I_{it}$) of product i in period t under scenario s, wherein the third term ($v_{iu} Q_{itu}$) refers to an ordering cost component, and comprises the unit production/order cost ($v_{iu}$) when product i is procured from supplier u, and the order quantity ($Q_{itu}$) of product i from supplier u in period t, wherein the fourth term·($b_i \cdot B_t$) refers to the backlog cost component, and comprises the unit backlog cost ($b_i$) for finished product i and the backlog amount ($B_t$) of finished product i in period t under scenario s, wherein the fifth term ($e_i \cdot B_T$) refers to the demand loss cost component, and comprises the unit demand loss cost ($e_i$) for finished product i and the backlog amount ($B_T$) of finished product i in period T under scenario s.

3. The method of claim 2, wherein the optimizing the model comprises:

minimizing the Equation considering at least one of the following constraints: number of suppliers, supply quantity, minimum contract duration, maximum contract duration, outsourced component inventory balance, produced component inventory balance, end-item inventory balance, production and ordering capacity, initial inventory, initial backlog, supplier selection, and non-negativity constraints.

4. The method of claim 1, further comprising:

displaying the predicted lead time generated by the model on a user interface.

5. The method of claim 4, wherein the displaying the predicted lead time on the user interface comprises:

presenting the predicted lead time for the ordered parts over a predetermined period in the form of a graph; and in response to receiving a user selection of the predicted lead time displayed on the graph, displaying a probability of the predicted lead time as a pop-up in the form of a graph.

6. The method of claim 1, wherein the generating a model for generating the predicted lead time for at least one of the final part and the ordered parts, comprises:

generating the model by using Sample Average Approximation (SAA) for a lead time scenario in the model, wherein the lead time scenario comprises a vector representing lead time values for all suppliers of each ordered part.

7. A non-transitory computer-readable recording medium, wherein the non-transitory computer-readable recording medium comprises computer-executable instructions, and the instructions, when executed by a processor, perform operations comprising:

receiving input data from a user;

identifying a final part corresponding to the input data;

identifying one or more components that constitute the final part;

classifying the identified one or more components into in-house production parts, which are produced in-house, and ordered parts, which are procured from suppliers;

determining a lead time for the in-house production parts;

obtaining, for each of the ordered parts, first data comprising at least price data and historical lead time data by: (i) operating an artificial intelligence (AI)-based knowledge mining robot including a trained classification model and a crawler to classify web resources as related or unrelated to the ordered part based on request information including at least a part identifier and data to be acquired, (ii) crawling and indexing data from the web resources classified as related and storing crawled unstructured data and index information in a raw data archive, and (iii) structuring, by a data analysis engine, the unstructured data into part-related fields including at least time-based price data and historical lead time data and storing the structured data in a parts knowledge database (KDB);

generating candidate feature expressions by combining the price data with arithmetic operators;

generating second data by removing an expression in which operational units do not match among the candidate feature expressions;

generating a model for generating the predicted lead time for at least one of the final part and the ordered parts by training, using a training dataset including the first data and the second data, a regression model comprising a genetic-programming-based decision tree, and iteratively updating the second data by: determining a mean square error (MSE) improvement attributable to each candidate feature expression, retaining a candidate feature expression when the MSE improvement exceeds a reference value, and otherwise generating third data using mutation and/or crossover operations and selecting surviving features through a tournament; and optimizing the model for generating the predicted lead time based on at least one of fixed costs, inventory costs, ordering costs, backlog costs, and demand loss costs.

\* \* \* \* \*